Nov. 25, 1941.   A. NOVICK   2,264,184
CLASP FASTENER AND METHOD OF MAKING SAME
Filed May 12, 1938
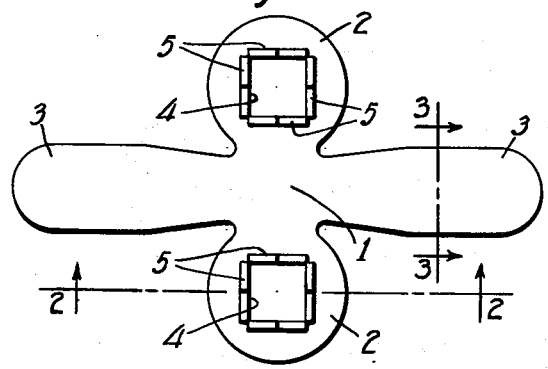
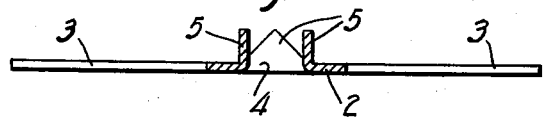
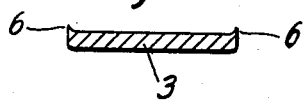
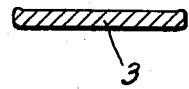
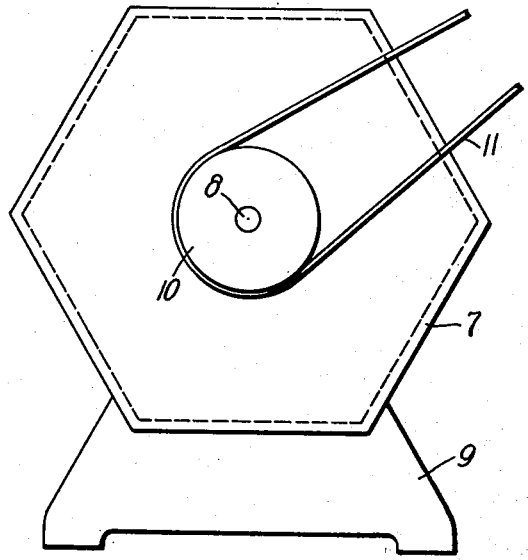
INVENTOR.
Abraham Novick
BY Moses & Nolte
ATTORNEYS Patented Nov. 25, 1941

2,264,184

UNITED STATES PATENT OFFICE 2,264,184

CLASP FASTENER AND METHOD OF MAKING SAME

Abraham Novick, Flushing, N. Y., assignor to F. L. Smithe Machine Co., Inc., New York, N. Y., a corporation of New York Application May 12, 1938, Serial No. 207,435

5 Claims. (Cl. 29—148)

This invention relates to clasp fasteners for envelopes and to a method of making such fasteners.

It has been common practice in the past to make clasp fasteners of the arm and leg type. Such a fastener is a thin sheet metal member having a central body portion from which attaching legs extend in opposite directions. Each attaching leg is commonly formed with a central opening bordered by attaching prongs, the prongs being adapted to be driven through the back of an envelope and clinched to secure the fastener firmly in place. The fastener also includes bendable arms which extend in opposite directions from the central body portion, the arms being disposed substantially at right angles to the legs. When the fastener is applied to the back of an envelope, the arms initially lie flat against the envelope. They are adapted, however, to be bent upward into parallelism, to be passed through an opening formed in the closure flap, and then folded outward again substantially to their original positions to hold the closure flap down.

Fasteners of the kind referred to are invariably stamped from thin malleable sheet metal. The stamping operation of necessity forms sharp edges and in some instances burrs upon the bendable arms. This is objectionable because the user is required to handle the arms in bending them and is apt to be cut or scratched by the sharp edges or burrs. Nothing has heretofore been done to ameliorate this condition.

It is a primary object of the present invention to round or smooth the edges of the fastener arms after they have been stamped and before the fasteners have been placed in the hands of the users.

To this end it is a feature that the fasteners are put into a tumbling drum in quantities and are caused by repeated contact with one another to have their edges smoothed and freed from burrs.

In this connection it is an important point, when the legs are formed with holes as referred to above, that the arms of the fasteners are made too broad to enter the holes formed in the legs of other fasteners so that there is no liability whatever of two or more fasteners becoming interlocked.

Other objects and advantages will hereinafter appear.

In the drawing forming part of this specification and illustrating a fastener embodying the invention, and certain steps in the procedure of making the fastener:

Fig. 1 is a bottom plan view of a fastener embodying the invention;

Fig. 2 is a sectional view taken upon the line 2—2 of Fig. 1 looking in the direction of the arrows;

Fig. 3 is a sectional view taken upon the line 3—3 of Fig. 1 looking in the direction of the arrows, and showing the condition of a fastener arm before tumbling;

Fig. 4 is a view similar to Fig. 3 showing the condition of a fastener arm after tumbling; and Fig. 5 is a fragmentary view showing in side elevation a tumbling drum in which the tumbling operation may be performed.

The fastener of Fig. 1 is composed of thin sheet metal and comprises a central body portion 1, legs 2 which extend in opposite directions from the central body portion, and arms 3 which extend in opposite directions from the central body portions and substantially at right angles to the direction in which the legs extend. The legs are formed with central openings 4, each bordered by a series of upstanding, triangular attaching prongs 5. The arms 3 are rather narrow at their bases adjacent the central body portion 1, but are intentionally made wide enough at their outer ends to assure that the arm of one fastener cannot enter an opening 4 of another fastener so that there will be no danger of two or more fasteners becoming interlocked with one another.

The fastener is a stamping, and as an incident of the stamping operation the edges at one side of the metal are made sharp and raw as indicated at 6 in Fig. 3. Some burring of the metal around the edges is also apt to occur. In order to eliminate the sharp edges and burrs, the fasteners are subjected to a tumbling operation. For this purpose a polygonal drum 7 is desirably employed capable of accommodating a considerable quantity of the fasteners, say a batch of 25,000. The drum 7 is carried by a shaft 8 which is rotatably supported from a base member 9. A pulley 10 is fast on the shaft. The pulley is driven by a belt 11 which is operated from any suitable source of power. After a considerable period of tumbling, say in the neighborhood of about one hour, the fasteners are removed from the drum and are found to have their edges smoothed and freed from burrs as illustrated in Fig. 4. The fasteners are now ready for packing and they are packed heterogeneously in containers, the entire quantity constituting a tumbling batch being put into a single package for shipment to an envelope manufacturer.

The term "burr," as used herein, is intended to refer to a protuberance having sharp points or edges which are apt to produce cuts or abrasions.

I have described what I believe to be the best embodiments of my invention. I do not wish, however, to be confined to the embodiments shown, but what I desire to cover by Letters Patent is set forth in the appended claims.

I claim:

1. The process of making arm and leg fasteners for envelopes, free from burrs and sharp edges, which comprises punching the fasteners with openings formed in the leg material bordered by attaching prongs and with the arms of too great width to enter such openings, and then tumbling the fasteners to eliminate burrs and sharp edges.

2. The process of making arm and leg fasteners for envelopes, free from burrs and sharp edges, which comprises forming the fasteners with arms and with pronged legs in such manner that interlocking of the fasteners with one another is precluded when the fasteners are scrambled together heterogeneously, and then tumbling the fasteners to eliminate burrs and sharp edges.

3. An arm and leg fastener for envelopes comprising a central body portion, bendable arms extending in opposite directions from the central body portion, attaching legs also extending in opposite directions from the central body portion and at substantially right angles to the arms, said legs being formed with central openings bordered by attaching prongs, and said arms being too wide to enter said openings and having their edges smooth and free from burrs.

4. An arm and leg fastener for envelopes comprising a central body portion, bendable arms extending in opposite directions from the central body portion, attaching legs also extending in opposite directions from the central body portion and at substantially right angles to the arms, said legs being formed with central openings bordered by attaching prongs, and said arms being too wide to enter said openings and having their edges free from burrs and smooth in the manner characteristic of the effect produced by tumbling.

5. The process of making fasteners for envelopes, free from burrs and sharp edges, which comprises punching sheet metal to form fasteners having a central body portion, a pair of legs extending in opposite directions from the central body portion, and a pair of arms extending in opposite directions from the central body portion and substantially at right angles to the direction of the legs, each leg having one large central opening bordered by a series of attaching prongs, the arms and legs each having a width greater than the maximum dimension of said openings thereby precluding entry of said arms or legs into said openings when the fasteners are scrambled together, and then tumbling the fasteners to eliminate burrs and sharp edges.

ABRAHAM NOVICK.